(12) United States Patent
Xu et al.

(10) Patent No.: US 9,275,100 B2
(45) Date of Patent: *Mar. 1, 2016

(54) METHOD, APPARATUS AND SYSTEM OF PROCESSING CORRELATED KEYWORDS (71) Applicant: Alibaba Group Holding Limited, Grand Cayman (KY)

(72) Inventors: Zhan Xu, Hangzhou (CN); Weiwei Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/096,862

(22) Filed: Dec. 4, 2013

(65) Prior Publication Data

US 2014/0089337 A1 Mar. 27, 2014

Related U.S. Application Data (63) Continuation of application No. 12/594,687, filed as application No. PCT/CN2007/070562 on Aug. 27, 2007, now Pat. No. 8,626,742.

(30) Foreign Application Priority Data

Apr. 6, 2007 (CN) .......................... 2007 1 0090413

(51) Int. Cl.
  G06F 17/30 (2006.01)
(52) U.S. Cl.
  CPC ...... *G06F 17/30386* (2013.01); *G06F 17/3064* (2013.01); *G06F 17/30864* (2013.01)
(58) Field of Classification Search
  None
  See application file for complete search history.

(56) References Cited

U.S. PATENT DOCUMENTS

| 6,169,986 B1 | 1/2001 | Bowman et al. |
| 6,523,028 B1 | 2/2003 | DiDomizio et al. |
| 7,529,744 B1 * | 5/2009 | Srivastava et al. |
| 7,853,676 B1 | 12/2010 | Freskos et al. |
| 7,865,873 B1 | 1/2011 | Zoellner et al. |
| 2002/0103876 A1 | 8/2002 | Chatani et al. |

(Continued)

FOREIGN PATENT DOCUMENTS

| CN | 1932817 A | 3/2007 |
| JP | 11045274 | 2/1999 |

(Continued)

OTHER PUBLICATIONS

The Chinese Office Action mailed Oct. 16, 2009 for Chinese patent application No. 2007100904133, a counterpart foreign application of U.S. Appl. No. 12/594,687, 16 pages.

(Continued)

*Primary Examiner* — Son T Hoang
(74) *Attorney, Agent, or Firm* — Lee & Hayes, PLLC (57) ABSTRACT

The present disclosure discloses a method, an apparatus and a system of processing related keywords. The method includes: receive a primary keyword inputted by a user; form a spliced URL for requesting related keywords based on the primary keyword; establish a link between an embedded window object in a current web page and a server using the URL to obtain the related keywords from the server; the embedded window object creates a keyword list and presents the related keywords in the current web page; and obtain a related keyword selected by the user and instantaneously add the related keyword into an input box.

10 Claims, 6 Drawing Sheets

(56) References Cited

U.S. PATENT DOCUMENTS

| | | |
|---|---|---|
| 2003/0225756 A1 | 12/2003 | Liu |
| 2004/0064447 A1 | 4/2004 | Simske et al. |
| 2004/0093563 A1* | 5/2004 | Pasquali .................. 715/513 |
| 2004/0143508 A1* | 7/2004 | Bohn et al. ............... 705/26 |
| 2004/0249790 A1 | 12/2004 | Komamura |
| 2005/0071332 A1 | 3/2005 | Ortega et al. |
| 2005/0171760 A1 | 8/2005 | Tinkler |
| 2005/0187923 A1 | 8/2005 | Cipollone |
| 2005/0192953 A1 | 9/2005 | Neale et al. |
| 2006/0031215 A1 | 2/2006 | Pong Robert |
| 2006/0080292 A1 | 4/2006 | Alanzi |
| 2006/0206475 A1 | 9/2006 | Naam et al. |
| 2006/0218136 A1 | 9/2006 | Surakka et al. |
| 2006/0248078 A1 | 11/2006 | Gross et al. |
| 2007/0156636 A1* | 7/2007 | Norton et al. ............... 707/1 |
| 2007/0174266 A1 | 7/2007 | Hsu |
| 2007/0214126 A1 | 9/2007 | Kikinis |
| 2007/0269775 A1* | 11/2007 | Andreev et al. ........... 434/156 |
| 2007/0282811 A1 | 12/2007 | Musgrove |
| 2007/0299815 A1 | 12/2007 | Starbuck et al. |
| 2008/0082486 A1* | 4/2008 | Lermant et al. ............... 707/3 |
| 2008/0168054 A1 | 7/2008 | Lee et al. |
| 2008/0208841 A1* | 8/2008 | Zeng ............ G06F 17/30648 707/1 |
| 2008/0288461 A1 | 11/2008 | Glennon et al. |
| 2011/0035403 A1 | 2/2011 | Ismalon |

FOREIGN PATENT DOCUMENTS

| | | |
|---|---|---|
| JP | 2004094388 | 3/2004 |
| JP | 2007034466 | 2/2007 |
| WO | WO9948028 A2 | 9/1999 |
| WO | WO2007029900 A1 | 3/2007 |

OTHER PUBLICATIONS

The Chinese Office Action mailed May 12, 2010 for Chinese patent application No. 2007100904133, a counterpart foreign application of U.S. Appl. No. 12/594,687, 6 pages.

Jing et al, "A Primary Study of Web Based Searching and Matching Algorithm Combined with Synonym", Journal of Anhui University (Natural Sciences), Sep. 2003, 4 pgs.

Translated Japanese Office Action mailed Feb. 22, 2013 for Japanese patent application No. 2010-501354, a counterpart foreign application of U.S. Appl. No. 12/594,687, 4 pages.

Translated Japanese Office Action mailed Jul. 20, 2012 for Japanese patent application No. 2010-501354, a counterpart foreign application of U.S. Appl. No. 12/594,687, 4 pages.

Korpela, Jukka, "Using Inline Frames (iframe elements) to Embed Documents into HTML Documents", Sep. 25, 2006, retrieved from the internet on Apr. 11, 2008 at http://www.cs.tut.fi/{jkorpela/html/iframe.html, 14 pgs.

Lianahua, "An Approach of Information Retrieval Based on Concept Space", Information Science, Issue 4, Apr. 2004, 5 pgs.

Ma, "Information Retrieval Study", Information Studies: Theory and Application, vol. 29, No. 2, Mar. 2006, 5 pgs.

Non-Final Office Action for U.S. Appl. No. 12/594,687, mailed on Dec. 23, 2011, Zhan Xu et al., "Method, Apparatus and System of Processing Correlated Keywords", 15 pages.

Non-Final Office Action for U.S. Appl. No. 12/594,687, mailed on Mar. 28, 2013, Zhan Xu et al., "Method, Apparatus and System of Processing Correlated Keywords", 19 pages.

Final Office Action for U.S. Appl. No. 12/594,687, mailed on Dec. 23, 2011, Zhan Xu et al., "Method, Apparatus and System of Processing Correlated Keywords", 16 pages.

Powell, A. T., "HTML Programmer's Reference", May 26, 1998, Osborne/ MacGraw-Hill, ISBN: 0-07-882559-8, 10 pgs.

Vernman, et al., "Using Javascript to Copy Data from One Form Field to Another", Mar. 4, 2006, retrieved from the internet: http://groups.google.com/macromedia.dreamweaver/browse_thread/cc6074cc3f530e71/1a5a28d2358bc67a?h1=en&ie=UTF-8&q=javascript+copy+information+to+a+field (retrieved on Oct. 11, 2010), 1 pg.

Final Office Action for U.S. Appl. No. 12/594,687, mailed on May 17, 2012, Zhan Xu et al., "Method, Apparatus and System of Processing Correlated Keywords", 16 pages.

* cited by examiner

Fig. 1

\* JOB CATEGORY: CHIEF TECHNOLOGY OFFICER CTO • CHIEF INFORMATION OFFICER CIO, INFORMATION TECHNOLOGY SPECIALIST, PROJECT EXECUTION • COORDINATOR, SENIOR SOFTWARE ENGINEER, SENIOR

LOCATION: PLEASE SELECT A CITY OR A REGION

CAREER CATEGORY: PLEASE SELECT A CAREER CATEGORY

KEYWORD: PLEASE ENTER A KEYWORD FOR JOB POSITION OR COMPANY ⦿ JOB POSITION ◯ COMPANY

KEYWORDS  dvd

MORE KEYWORDS  vcd, mp3

Suggested keywords                                      Close
Home Appliances
  dvd player
  portable dvd
  vcd
  mp3
  vcd player
  tv
  home appliance
  electronics
  divx player
  video
  amplifiers
  svcd
  video equipment
  speakers
Printing & Publishing
  cd
others
  car dvd
  dvd-r
  dvd+r
  dvd-rw
  car video
                                                        Close

METHOD, APPARATUS AND SYSTEM OF PROCESSING CORRELATED KEYWORDS

This is a continuation application which claims priority to commonly assigned and co-pending U.S. patent application Ser. No. 12/594,687, filed Nov. 6, 2009, which is the national stage application based on the international patent application PCT/CN2007/070562, filed Aug. 27, 2007, which claims priority from a Chinese patent application, Application No. 200710090413.3, which has been filed to China Patent Office on Apr. 6, 2007, entitled "METHOD AND SYSTEM OF PROCESSING CORRELATED KEYWORDS", which applications are incorporated herein in their entirety by reference.

TECHNICAL FIELD

The present disclosure relates to the field of data processing, and particularly relates to methods, apparatuses and systems of processing related keywords.

BACKGROUND ART

Along with the rapid increase of the use of texts and multimedia contents on the Internet and other data networks and systems, an end user has become increasingly reliant on keyword-based search tools to find required information. In order to obtain a better and more accurate search result, one existing method provides related keywords to to be selected to conduct further searches.

Figure 1:
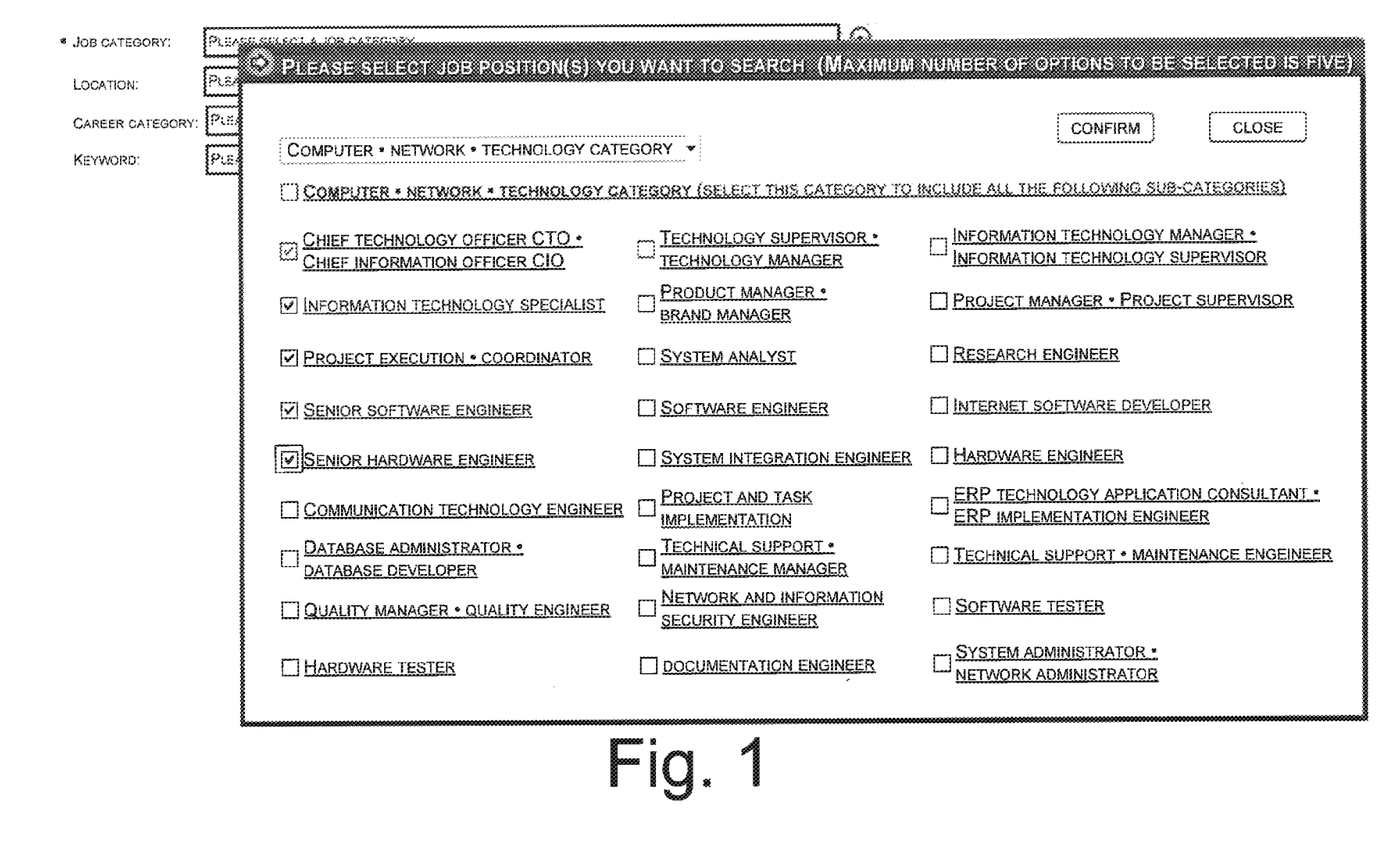
FIG. 1 shows a schematic diagram of a display interface of related keywords in existing technologies.
Figure 2:
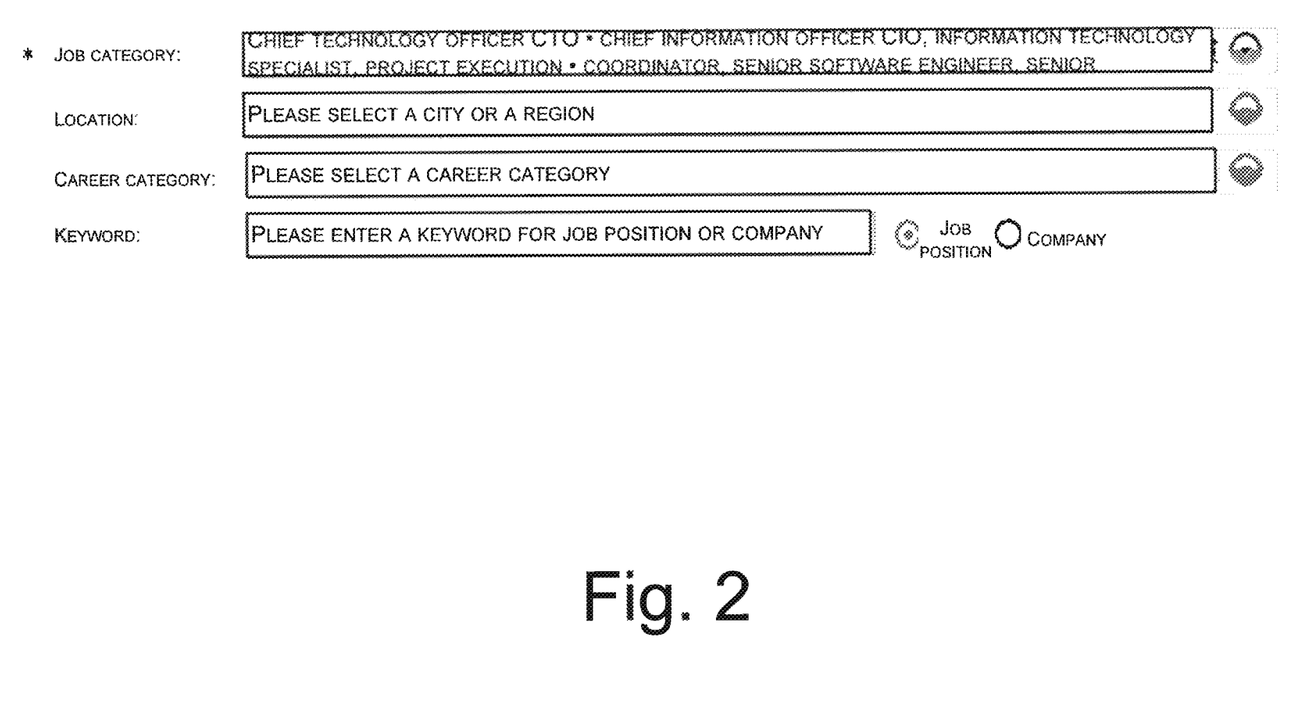
FIG. 2 shows a schematic diagram of a resulting interface upon selection of multiple related keywords in the display interface described in FIG. 1.

In existing technologies, a process of selecting related keywords includes: click a selection button of related keywords to open a selection window of the related keywords; select related keywords in the window; close the window; and present all selected related keywords in an input box. For example, one display interface of related keywords according to existing technologies is shown in FIG. 1. Based on this interface, a selection process by a user is as follows. Open a search window of job categories upon clicking a selection button besides "job categories". The user checks relevant categories after selecting "computer network technology generally", and clicks a "confirm" button upon selection to obtain a presentation of the corresponding "job categories" as shown in FIG. 2.

As the demands for information rapidly increase, searching has become one of the most frequently used applications in information technology. However, the users experience some deficiencies of the above method of selecting related keywords in these frequently used information search applications. A selection window usually blocks out the related content of a current page, leading to a poor user experience. When multiple related keywords are selected, the user cannot see the result corresponding to multiple selections before completing the selections in a selection window, making the operations non-intuitive.

Therefore, a current technical problem that requires a solution is how to process related keywords in order to satisfy the ever-increasing operating and browsing requirements of users.

DESCRIPTION OF THE INVENTION

Exemplary embodiments of the present disclosure provide a method of processing related keywords in order to obtain a better user interface of presenting related keywords and an intuitive operating instruction when a user selects related keywords or conducts other operations.

Another goal of the exemplary embodiments of the present disclosure is to implement the above method of processing related keywords by providing an apparatus and a system of processing related keywords.

In order to solve the above technical problem, the exemplary embodiments of the present disclosure provide a method of processing related keywords, which includes:

receiving a primary keyword inputted by a user;

based on the primary keyword, forming a spliced URL for requesting related keywords of the primary keyword;

establishing a link between an embedded window object in a current web page and a server using the URL to obtain the related keywords from the server;

creating a keyword list to present the related keywords in the current web page by the embedded window object; and obtaining a related keyword selected by the user and instantaneously adding the related keyword into an input box.

Preferably, the method may further include:

acquiring a plurality of related keywords by instantaneously adding related keywords selected by the user using a plurality of additions.

Preferably, the method further includes:

determining whether the number of the related keywords in the input box is greater than or equal to a predetermined number, and closing the keyword list if affirmative.

Preferably, the method further includes:

determining whether the related keyword selected by the user is a duplicate of a related keyword already in the input box, and skipping adding the related keyword into the input box if affirmative; and/or determining whether the input box already has any related keyword, and instantaneously inserting a separator prior to the related keyword to be added if affirmative.

Preferably, creating the keyword list includes:

predetermining a keyword list container, which includes one or more related-keyword containers;

receiving a request for opening the keyword list and obtaining a height value of the keyword list and an offset relative to an input box based on the request; and setting a height of the keyword list container and a position thereof in the current web page based on the height value of the keyword list and the offset relative to the input box.

Preferably, presenting the keyword list includes:

predetermining a style for the keyword list container; and presenting the related keywords in the keyword list container based on the style.

Preferably, obtaining the related keyword selected by the user includes:

obtaining a related-keyword container corresponding to the related keyword selected by the user and altering a style for the related-keyword container; and retrieving the related keyword in the related-keyword container based on a request for selecting the related keyword from the user.

The exemplary embodiments of the present disclosure further provides a system of processing related keywords, which includes an apparatus of processing related keywords, and a server. The apparatus includes;

an interface unit, used for receiving a primary keyword inputted by a user;

a splicing unit, used for forming a spliced URL for requesting related keywords corresponding to the primary keyword based on the primary keyword;

an object processing unit comprising a linking unit, a creating unit and a presenting unit, wherein the linking unit is used for establishing a link between an embedded window object in a current web page and the server using the URL, the creating unit is used for creating a keyword list through the embedded window object, and the presenting unit is used for presenting the related keywords through the embedded window object;

an acquisition unit, used for obtaining a related keyword selected by the user; and an adding unit, used for instantaneously adding the related keyword obtained by the acquisition unit into an input box.

The server is used for exchanging data with the object processing unit of the apparatus of processing related keywords.

Furthermore, the exemplary embodiments of the present disclosure further provide an apparatus of processing related keywords. The apparatus includes:

an interface unit, used for receiving a primary keyword inputted by a user;

a splicing unit, used for forming a spliced URL for requesting related keywords corresponding to the primary keyword based on the primary keyword;

an object processing unit comprising a linking unit, a creating unit and a presenting unit, wherein the linking unit is used for establishing a link between an embedded window object in a current web page and the server using the URL, the creating unit is used for creating a keyword list through the embedded window object, and the presenting unit is used for presenting the related keywords through the embedded window object;

an acquisition unit, used for obtaining a related keyword selected by the user; and an adding unit, used for instantaneously adding the related keyword obtained by the acquisition unit into an input box.

Preferably, apparatus further includes:

a multi-keyword acquisition unit, used for obtaining a plurality of related keywords by instantaneously adding the plurality of related keywords into the input box through a plurality of additions.

Preferably, apparatus further includes:

a first determining unit, used for determining whether number of related keywords in the input box is greater than or equal to a predetermined number, and closing the keyword list if affirmative.

Preferably, apparatus further includes:

a second determining unit, used for determining whether a obtained related keyword is a duplicate of any related keyword in the input box, and skipping adding the related keyword into the input box if yes; and/or a third determining unit, used for determining whether the input box already has any related keyword, and instantaneously inserting a separator prior to the related keyword to be added if affirmative.

Preferably, the creating unit includes:

a predetermination sub-unit, used for predetermining a keyword list container, where the keyword list container includes one or more related-keyword containers;

a receiving/obtaining sub-unit, used for receiving a request for opening the keyword list and obtaining a height value of the keyword list and an offset relative to the input box based on the request; and a setting sub-unit, used for setting a height of the keyword list container and a position thereof in the current web page based on the height value of the keyword list and the offset relative to the input box.

Preferably, the presenting unit includes:

a style predetermination sub-unit, used for predetermining a style for the keyword list container; and a keyword presenting sub-unit, used for presenting related keywords in the keyword list container according to the style.

Preferably, the acquisition unit includes:

a container acquisition sub-unit, used for obtaining a related-keyword container corresponding to a selection by the user;

a modification sub-unit, used for altering a style for the related-keyword container; and a retrieving sub-unit, used for retrieving related keywords in the related-keyword container based on a request by the user for retrieving related keywords.

Compared with existing technologies, the exemplary embodiments of the present disclosure have the following advantages.

First, by setting an embedded window object to present related keywords, the exemplary embodiments of the present disclosure allow a close association between a keyword list and an input box, and provide an excellent display interface to allow a user to clearly discern a correspondence relationship between the keyword list and the input box. This gives a good user experience.

Second, through instantaneously adding a user-selected related keyword into the input box, the exemplary embodiments of the present disclosure make user operations more intuitive and thus improve efficiency of user operations.

Moreover, by optimizing the process of adding related keywords, the exemplary embodiments of the present disclosure avoid an addition of an invalid related keyword and further optimize the interface, thus allowing the user to obtain a better operation experience.

Furthermore, through controlling the highlighting of the input box and the keyword list by means of a style sheet, the exemplary embodiments of the present disclosure allow the user to instantly see the result of an operation and therefore ensure more intuitive user operations.

Finally, from a service provider's perspective, the exemplary embodiments of the present disclosure require no special secure algorithms, are easy to implement, and have a low development cost.

EXEMPLARY EMBODIMENTS

In order to more clearly and easily understand the goals, characteristics and advantages of the present disclosure, the present disclosure is described in further detail below using accompanying figures and exemplary embodiments.

Figure 3:
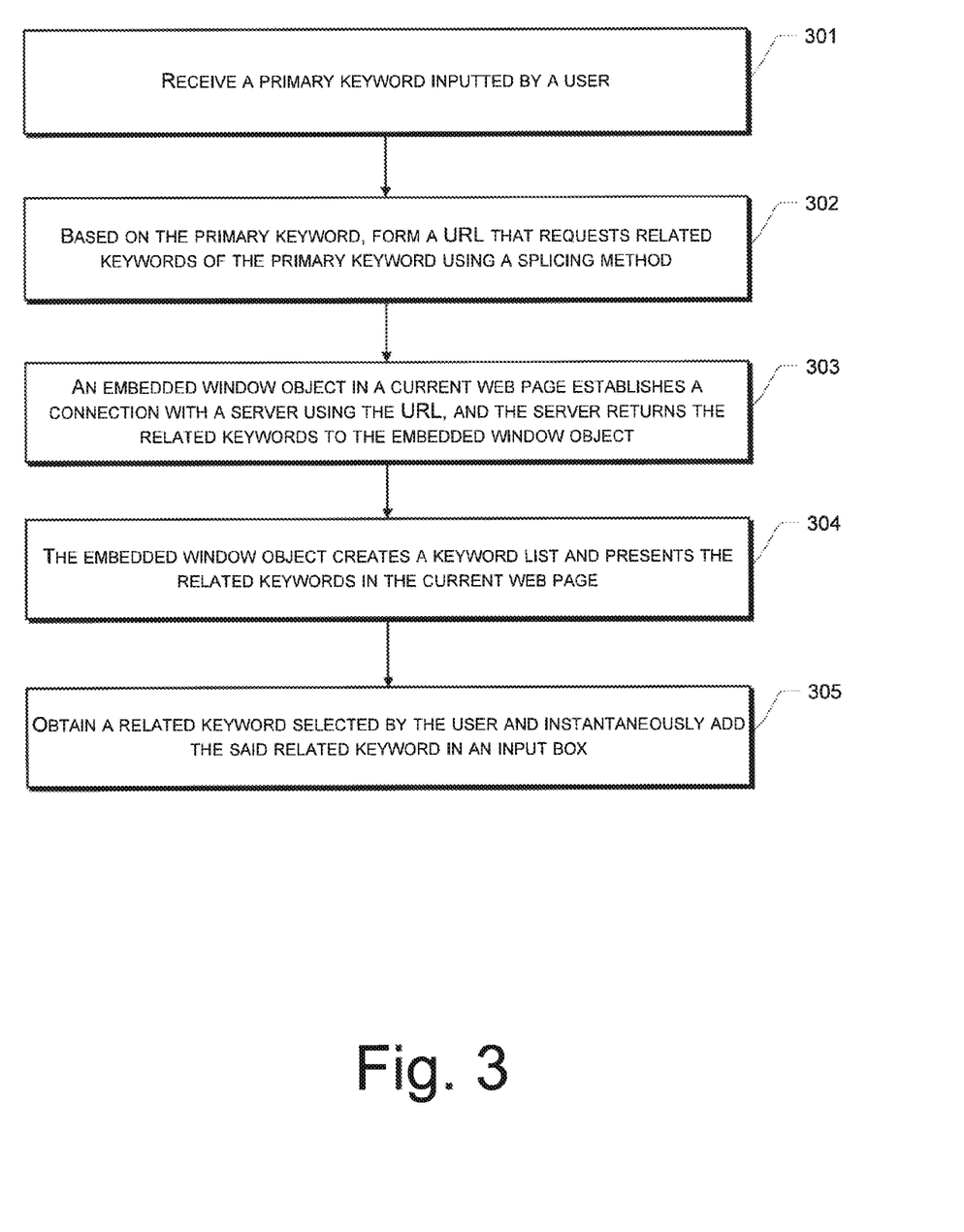
FIG. 3 shows a flow chart of an exemplary method of processing related keywords in accordance with the present disclosure.

FIG. 3 shows a flow chart of an exemplary method of processing related keywords in accordance with the present disclosure. Specifically, the method includes the procedures described below.

At Block 301, receive a primary keyword inputted by a user.

At Block 302, based on the primary keyword, form a spliced URL (Uniform Resource Locator) to request related keywords of the primary keyword.

At Block 303, an embedded window object in a current web page establishes a link with a server using the URL. The server returns the related keywords to the embedded window object.

At Block 304, the embedded window object creates a keyword list to present the related keywords.

At Block 305, obtain a related keyword selected by the user and instantaneously add the related keyword into an input box.

It should be noted that a related keyword can be any keyword that has a relationship with the primary keyword. Examples include a related keyword that is extracted from webpages by matching to the primary keyword, a related keyword that is matched visually or intuitively, or a related keyword that is related by meaning. The correspondence relationship may be determined by one skilled in the art according to experiences or needs. The present disclosure does not have any limitation this.

It is appreciated that the user inputs the primary keyword in a primary keyword input box to trigger a local program or a script program of the current web page for receiving the primary keyword inputted by the user. Exemplary acts of triggering may include: clicking the primary keyword input box using a mouse, entering into the primary keyword input box through a TAB button, and other triggering actions. Based on the primary keyword, the local program or the script program of the current web page subsequently splices the URL that requests the related keywords of the primary keyword. Preferably, the splicing of a URL of related keywords may be in the form of: prefix of server URL+primary keyword+related keyword ID. For example, if the primary keyword is "tea", a related keyword ID is "1", and a prefix of a server URL is http://sh.vip.alibaba.com/front/relatedKeywordsFront.htm, then a URL of related keywords will be http://sh.vip.alibaba.com/front/relatedKeywordsFront.htm?keywords=tea&pdSessionId=1.

Naturally, the method of forming a spliced URL may be freely determined by one skilled in the art according to needs or experience. For example, it is possible to set up related keyword IDs according to a corresponding related keyword group list, and/or to set up a category parameter of the primary keyword, as well as adopt other methods of forming a spliced URL. The present disclosure does not have any limitation on this matter.

Upon forming the spliced URL, the embedded window object in the current web page may establish a link with the server using the URL. Preferably, the embedded window object is iframe, where iframe is a form of framework and can be embedded in any arbitrary part of the web page. Under this circumstance, a src property of iframe in the current web page is set to be the URL, thereby allowing iframe to access the URL to send a GET request to the server. The server returns the related keywords to the embedded window object. Naturally, the embedded window object can be any other window object in existing technologies (e.g., frame). The present disclosure does not have any limitation on this matter.

Preferably, the embedded window object creates the keyword list through the procedure below.

A sub-block A1 predetermines a keyword list container. The keyword list container includes one or more related-keyword containers.

Herein, a container has properties such as margin, padding, frame, width, height, float and clear. In this exemplary embodiment, an initial status of a container may be preset to be float and hidden.

A sub-block A2 receives a request for opening the keyword list and obtains a height value of the keyword list and an offset relative to the input box based on the request.

The user can click the input box using a mouse, enter the input box through a TAB button, or use any other triggering actions to trigger a request for opening the keyword list. The embedded window object may obtain the predetermined height value of the keyword list and the offset relative to the input box in the local program or the script program of the current web page. Naturally, the method of obtaining such information can be selected by one skilled in the art according to experience or needs. The present disclosure does not have any limitations on this matter.

A sub-block A3 sets the height of the keyword list container and its position in the current web page based on the height value of the keyword list and the offset relative to the input box.

Using the above setup, the keyword list and the input box are closely associated with each other to provide an excellent display interface. This allows the user to clearly discern a correspondence relationship between the keyword list and the input box and have a good user experience.

Naturally, the method of creating a keyword list by an embedded window object can be any suitable method in existing technologies. The present disclosure does not have any limitations on this matter.

In practice, the above scheme in the exemplary embodiments of the present disclosure can be applied to a situation where one or more related keywords are added into a single input box, or a situation where one or more related keywords are separately added into multiple input boxes. When one or more related keywords are separately added into multiple input boxes, the height values and relative offsets and are obtained in a like manner. That is, height values and offsets corresponding to a local program or a script program of a current web page are obtained based on a request for opening keyword lists. Based on the height values and offsets, heights of the keyword lists and respective positions in the current web page are separately set up.

Preferably, the procedure of presenting the related keywords includes the following sub-procedures:

A sub-block B1 predetermines a style for the keyword list container.

A sub-block B2 presents the related keywords in the keyword list container according to the style.

Preferably, a style for a keyword list container may be controlled using CSS (Cascading Style Sheets). For example, a CSS rule may be created to automatically complete a format setup and control a present font to be in red color and background to be green, etc., within a text range that is indicated by a class property.

Under this circumstance, the related keyword that is selected by the user may preferably be obtained through the following procedures:

A sub-block C1 obtains a related-keyword container corresponding to the user selection and changes the style for the related-keyword container.

A sub-block C2 takes the related keyword in the related-keyword container according to the request for selecting the related keyword from the user.

In practice, one application scenario may be as follows. When a user moves a mouse over a certain related keyword in a keyword list, a local program or a script program of a current web page is triggered to obtain a container of the related keyword and control a style sheet to alter the style for the related-keyword container such that the related keyword appears distinct from other related keywords. For example, the related keyword is highlighted by controlling the style sheet to give user a more intuitive and convenient presentation and easier operation.

In order to improve the efficiency of processing the related keywords, the exemplary method may obtain related keywords dynamically. Specifically, refreshed content in a container is obtained each time under the premise of not changing the height and the position of the container. This way, when a user submits a request for selecting related keywords by clicking on a certain keyword or any other method, a local program or a script program of the current web page only needs to simply retrieve the related keyword in the pertinent container according to the request.

One deficiency of the existing technologies of that causes non-intuitive operations for a user is that when multiple related keywords are selected, a result of multiple selections cannot be obtained until the user has completed all selections in a selection window. To overcome this problem, the exemplary method instantaneously adds a selected related keyword into an input box once the related keyword has been selected by the user. Multiple related keywords are obtained by multiple instantaneous additions of related keywords into an input box. Under this circumstance, the exemplary method may further include the following procedure to optimize related keywords that are added into an input box.

First, determine whether the number of related keywords in the input box is greater than or equal to a predetermined number, and close the keyword list if affirmative.

For example, suppose the number of related keywords that can be added to an input box is preset to be seven. After the user has selected seven related keywords, the keyword list is closed, indicating that the number of related keywords in the input box is met and no more related keyword can be added into the input box.

Preferably, the exemplary method may further include the following optimization procedures:

determine whether an obtained related keyword is a duplicate of any related keyword in the input box, and skip adding the related keyword into the input box if yes; and/or determine whether the input box already has any related keyword, and insert a separator prior to the related keyword to be added if yes. For example, a comma may be used as a separator to separate related keywords.

It is noted that the above optimization procedures may be applied individually or in any arbitrary combination depending on the needs. In other words, one may use just a single procedure or multiple procedures. The above procedures may be freely combined and do not have any limitation on the sequence. Moreover, one may further set up other optimization procedures based on the needs. For example, existing related keywords in the input box may be cleaned up to remove the empty spaces between commas; consecutive commas may be combined into one comma; or an empty space may be converted into a comma, etc. The present disclosure does not have any limitations on this matter.

In practice, a preferred optimization scheme may include the following procedures.

A block A determines whether the number of related keywords in the input box is greater than or equal to a predetermined number, and close the keyword list if affirmative.

A block B determines whether an obtained related keyword is a duplicate of any related keyword in the input box, and will not add the related keyword into the input box if yes.

A block C determines whether the input box already has any related keyword, and instantaneously inserts a separator prior to the related keyword to be added if yes.

A block D determines whether the number of related keywords in the input box is greater than or equal to the predetermined number, and closes the keyword list if yes.

Figure 4:
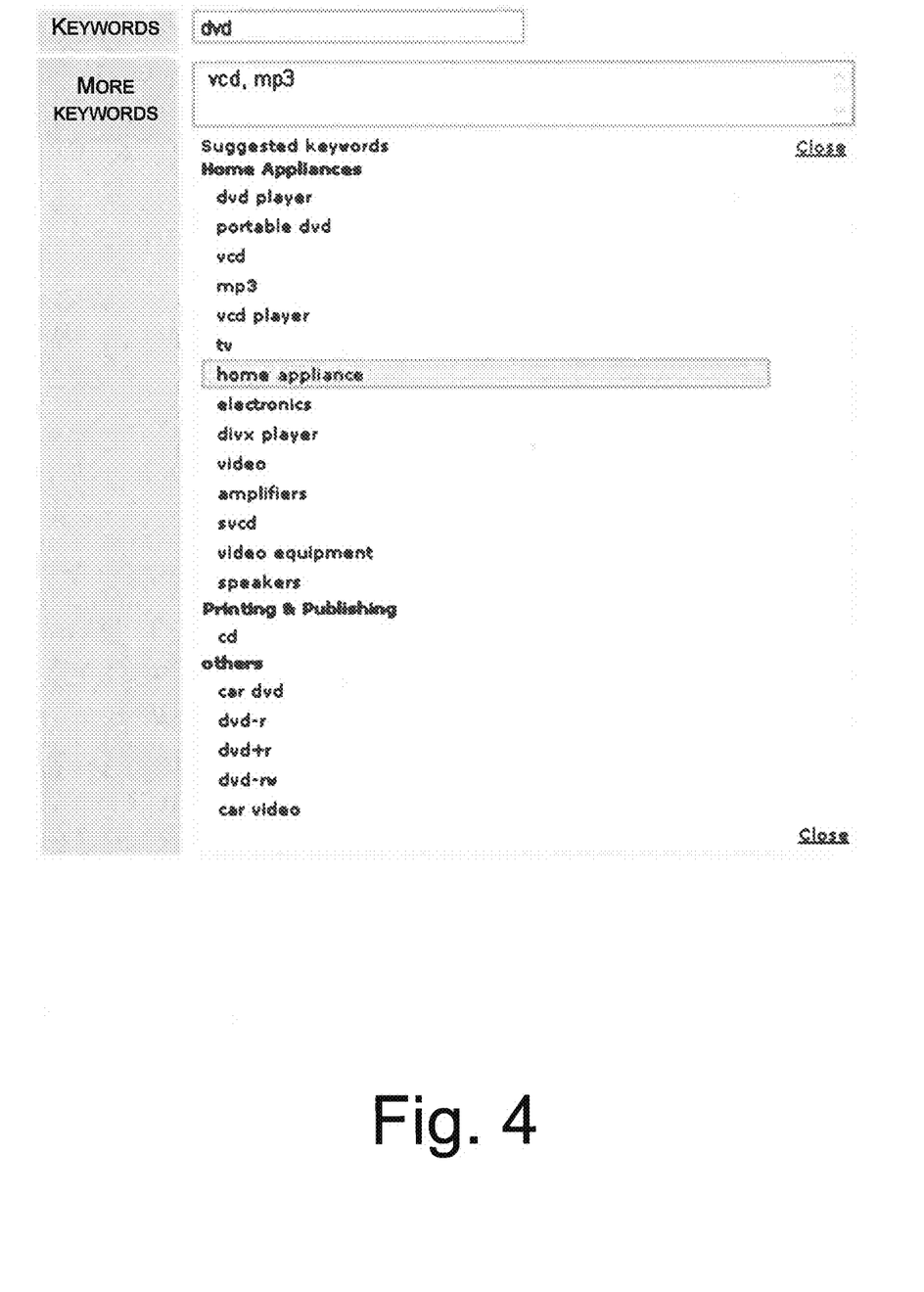
FIG. 4 shows a schematic diagram of obtaining a display interface of related keywords using the method disclosed in FIG. 3.

FIG. 4 shows a display interface of related keywords obtained using the disclosed method. A user inputs a primary keyword, "dvd", into an input box. A corresponding keyword list refers to the content corresponding to "Suggested keywords". When a mouse of the user moves to "home appliance", the exemplary method changes the style for the container of "home appliance" to distinguish it from other related keywords. The input box already has related keywords—"vcd" and "mp3" at this point. If the user clicks "home appliance" using the mouse, the related keyword "home appliance" is added after inserting a comma behind "mp3". From this display interface, it is clear that the exemplary method allows a close association between a keyword list and an input box of a current web page for a good display interface. The user can easily discern a correspondence relationship between the keyword list and the input box to have a good operating experience. Moreover, by instantaneously adding a related keyword selected by the user into the input box, user operation is more intuitive, thus improving efficiency of user operations.

Figure 5:
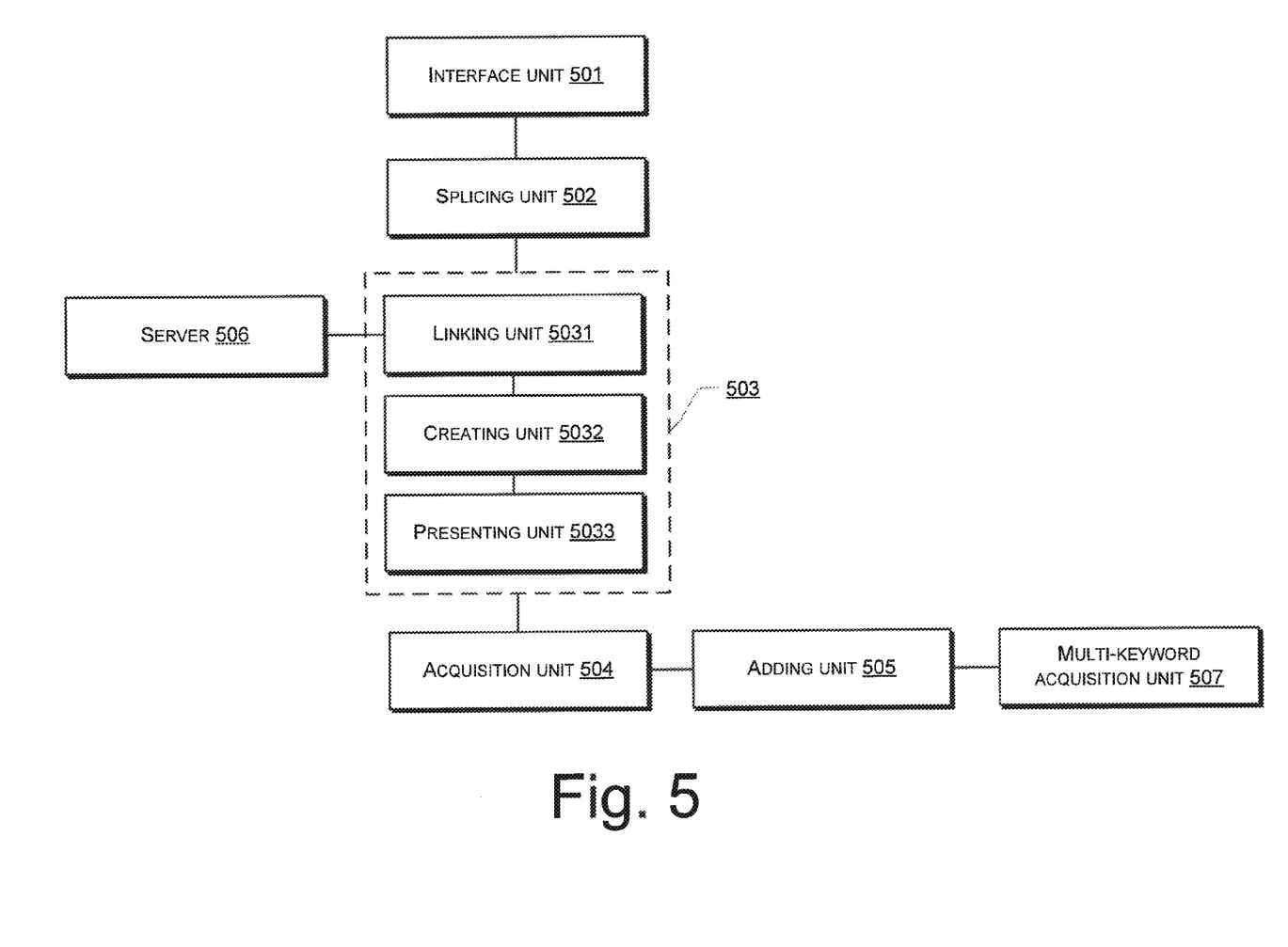
FIG. 5 shows a structural diagram of an exemplary system of processing related keywords in accordance with the present disclosure.

FIG. 5 shows a structural diagram of an exemplary system of processing related keywords in accordance with the present disclosure. The system includes a server 506 and an apparatus of processing related keywords. The apparatus of processing related keywords includes several units as follows.

An interface unit 501 is used for receiving a primary keyword inputted by a user. A splicing unit 502 is used for forming a spliced URL for requesting the corresponding related keywords based on the primary keyword. An object processing unit 503 includes a linking unit 5031, a creating unit 5032 and a presenting unit 5033. The linking unit 5031 is used for establishing a link between an embedded window object in a current web page and the server 506 using the URL. The creating unit 5032 is used for creating a keyword list through the embedded window object, and the presenting unit 5033 is used for presenting the related keywords through the embedded window object.

An acquisition unit 504 is used for obtaining a related keyword selected by the user. An adding unit 505 is used for instantaneously adding the related keyword into an input box. The server 506 is used for exchanging data with the object processing unit 503 in the apparatus of processing related keywords.

Preferably, the apparatus may further include a multi-keyword acquisition unit 507, which is used for obtaining a plurality of related keywords by instantaneously adding the related keywords into the input box using multiple additions.

Preferably, the creating unit 5032 may include sub-units as follows. A predetermination sub-unit is used for predetermining a keyword list container, where the keyword list container includes one or more related-keyword containers. A receiving/obtaining sub-unit is used for receiving a request for opening the keyword list and obtaining a height value of the keyword list and an offset relative to the input box based on the request. A setting sub-unit is used for setting a height and a position of the keyword list container in the current web page based on the height of the keyword list and the offset relative to the input box.

Preferably, the presenting unit 5033 may include the sub-units as follows. A style predetermination sub-unit is used for predetermining a style for the keyword list container. A keyword presenting sub-unit is used for presenting the related keywords in the keyword list container according to the style.

Preferably, the acquisition unit 504 may include the sub-units as follows. A container acquisition sub-unit is used for obtaining a related-keyword container corresponding to a selection by the user. A modification sub-unit is used for altering a style for the related-keyword container. A retrieving sub-unit is used for retrieving related keywords in the related-keyword container based on a request by the user for retrieving related keywords.

Preferably, the apparatus may further include a first determination unit used for determining whether the number of related keywords in the input box is greater than or equal to a predetermined number, and closing the keyword list if affirmative.

Preferably, the system may further include additional optimization units as follows. A second determination unit is used for determining whether an obtained related keyword is a duplicate of any related keyword in the input box, and not adding the related keyword into the input box if yes. A third determination unit is used for determining whether the input box already has any related keyword and inserting a separator prior to the related keyword to be added if yes.

The above optimization units may be used in any arbitrary combination according to the needs. One may use just one optimization unit or multiple optimization units. Moreover, the optimization units may be freely combined. Furthermore, one may set up various other optimization units. The present disclosure does not have any limitations on this.

Figure 6:
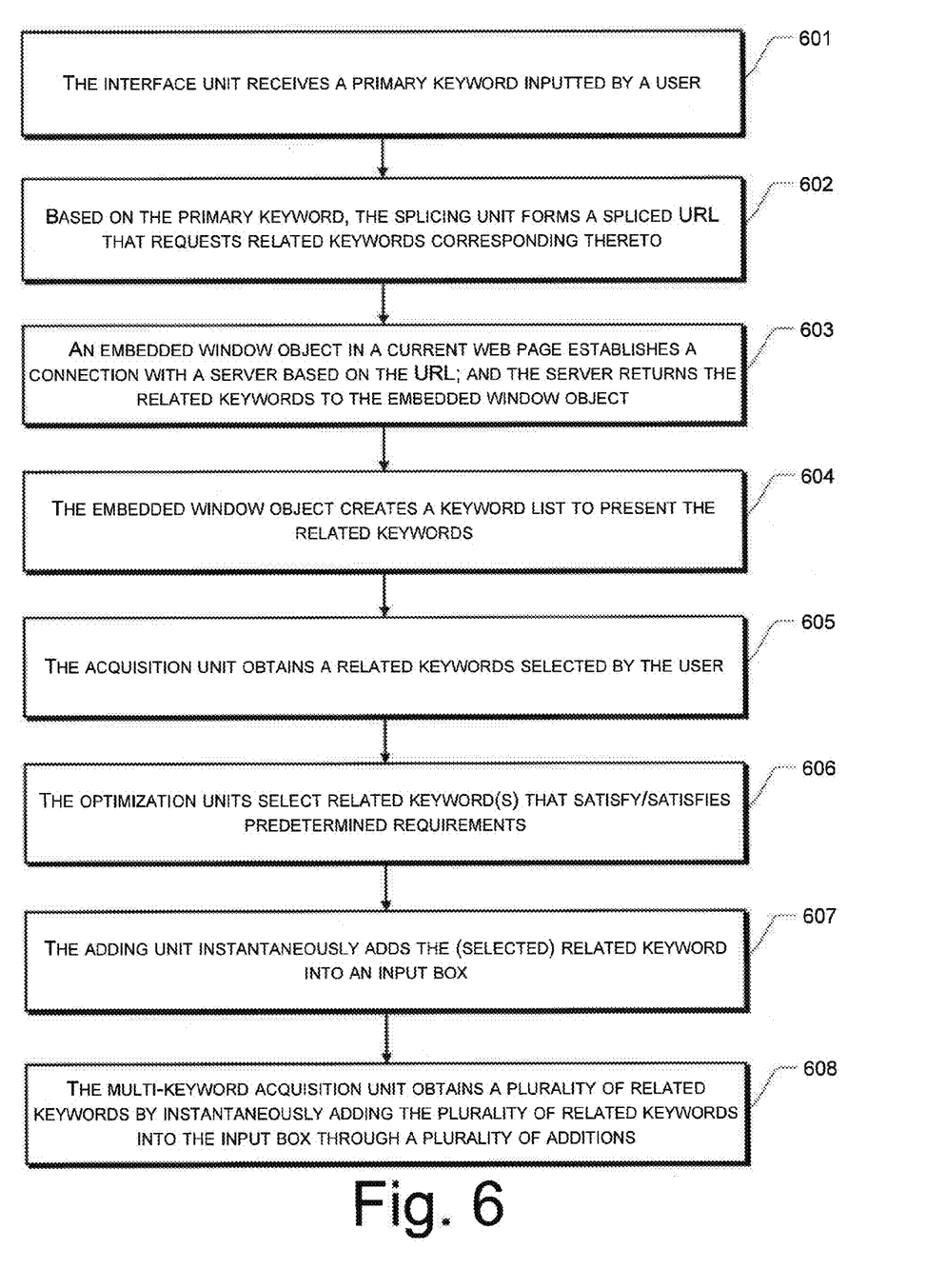
FIG. 6 shows a flow chart of an exemplary method of processing related keywords using the system in FIG. 5.

FIG. 6 shows a flow chart of an exemplary method of processing related keywords using the system disclosed in FIG. 5. The method includes the following procedures.

At Block 601, the interface unit receives a primary keyword inputted by a user.

At Block 602, based on the primary keyword, the interface unit forms a spliced URL for requesting related keywords of the primary keyword.

At Block 603, an embedded window object in a current web page establishes a link with a server using the URL. The server returns the related keywords to the embedded window object.

At Block 604, the embedded window object creates a keyword list to present the related keywords.

Preferably, the keyword list is created using the following procedures. At a sub-block D1, a predetermining sub-unit predetermines a keyword list container, where the keyword list container includes one or more related-keyword containers. At a sub-block D2, a receiving/obtaining sub-unit receives a request for opening the keyword list and obtains a height value of the keyword list and an offset relative to an input box according to the request. At a sub-block D3, a setting sub-unit sets a height of the keyword list container and a position thereof in the current web page based on the height value of the keyword list and the offset relative to the input box.

Preferably, the related keywords are presented using the following procedures. At a sub-block E1, a style predetermining unit predetermines a style for the keyword list container. At a sub-block E2, a keyword presenting sub-unit presents the related keywords in the keyword list container according to the style.

At Block 605, the acquisition unit obtains a related keyword selected by the user.

At Block 606, the optimization units select related keywords that satisfy predetermined requirements.

Preferably, the related keywords that satisfy the predetermined requirement are selected through the following procedures. At a sub-block F1, the first determination unit determines whether the number of related keywords in the input box is greater than or equal to a predetermined number, and closes the keyword list if affirmative. At a sub-block F2, the second determination unit determines whether an obtained related keyword is a duplicate of any related keyword already in the input box, and will not add the related keyword into the input box if affirmative. At a sub-block F3, the third determination unit determines whether the input box already has any related keyword, and inserts a separator prior to the related keyword to be added if affirmative. At a sub-block F4, the first determination unit determines whether the number of related keywords in the input box is greater than or equal to the predetermined number, and closes the keyword list if affirmative.

At Block 607, the adding unit instantaneously adds the related keyword into the input box.

At Block 608, the multi-keyword acquisition unit obtains a plurality of related keywords by adding related keywords into the input box using multiple additions.

As the system disclosed in FIG. 5 corresponds to foregoing exemplary methods, description of the method is relatively brief. Any missing details may refer to descriptions of related foregoing portions in the present disclosure.

The method and the system of processing related keywords in the present disclosure have been described in details above. Exemplary embodiments are employed to illustrate the concept and implementation of the present invention in this disclosure. The exemplary embodiments are only used for better understanding of the method and the core concepts of the present invention. Based on the concepts in this disclosure, one of ordinary skills in the art may modify the exemplary embodiments and application fields. In general, contents in the present disclosure should not be construed as limitations to the disclosed methods and apparatuses.

The invention claimed is:

1. A method of processing correlated keywords, the method comprising:
   providing a web page having a first input box and at least a second input box;
   receiving, from a user device associated with a user, a keyword inputted in the first input box;
   obtaining, by one or more servers associated with the web page, multiple related keywords that are related to the inputted keyword;
   receiving a user selection from the user of a related keyword of the multiple related keywords;
   providing a keyword list including the related keyword, wherein the keyword list is created using an embedded window object associated with the second input box;
   in response to a receipt of an additional user selection from the user of an additional related keyword of the multiple related keywords:
      determining whether the keyword list includes a duplication of the additional related keyword, and
      updating the keyword list by adding the additional related keyword into the keyword list in response to:
         a determination that a number of keywords existing in the keyword list is not greater than a predetermined value, and
         a determination that the keyword list does not already include the additional related keyword, wherein the updating the keyword list comprises:
            updating the second input box to include the related keyword; and adding the additional related keyword to the second input box before the user completes selections of any remaining additional related keywords;

presenting to the user the updated keyword list; and enabling a search by the user using the updated keyword list.

2. The method of claim 1, wherein the embedded window object includes a predetermined height value of the keyword list and an offset that is relative to an input box that presents the keyword list.

3. Server hardware memory encoded with instructions that, when executed by a processor of a server, performs acts comprising:

provide a web page having a first input box and at least a second input box;

receiving, from a user device associated with a user, a keyword inputted in the first input box;

obtaining multiple related keywords that are related to the inputted keyword;

receiving a user selection from the user of a related keyword of the multiple related keywords;

providing a keyword list including the related keyword, wherein the keyword list is created using an embedded window object associated with the second input box;

in response to a receipt of an additional user selection from the user of an additional related keyword of the multiple related keywords:

determining a number of keywords existing in the keyword list, determining whether the keyword list includes a duplication of the additional related keyword, and updating the keyword list by adding the additional related keyword into the keyword list in response to:

a determination that the number of existing keywords is not greater than a predetermined value, and a determination that the keyword list does not already include the additional related keyword, wherein the updating the keyword list comprises:

updating the second input box to include the related keyword; and adding the additional related keyword to the second input box before the user completes selections of any remaining additional related keywords;

presenting to the user the updated keyword list; and enabling a search by the user using the updated keyword list.

4. The server memory of claim 3, wherein the presenting the updated keyword list comprises presenting the updated keyword list using Cascading Style Sheets (CSS).

5. The server memory of claim 3, wherein the embedded window object includes a predetermined height value of the keyword list and an offset that is relative to an input box that presents the keyword list.

6. The server memory of claim 3, wherein the presenting the updated keyword list comprises presenting the updated keyword list using a predetermined graphic style.

7. A system for processing correlated keywords, the system comprising:

one or more servers including multiple hardware components including:

an interface unit configured to:

provide a web page having a first input box and at least a second input box;

receive, from a computing device associated with a user, a keyword inputted in the first input box;

obtain multiple related keywords that are related to the keyword; and receive a selection from the user of a related keyword of the multiple related keywords;

an object processing unit configured to:

provide a keyword list including the related keyword, wherein the keyword list is created using an embedded window object associated with the second input box;

in response to a receipt of an additional user selection from the user of an additional related keyword of the multiple related keywords:

determine a number of keywords existing in the keyword list;

determine whether the keyword list includes a duplication of the additional related keyword; and update the keyword list by adding the additional related keyword into the keyword list in response to:

a determination that the number of keywords existing in the keyword is not greater than a predetermined value, and a determination that the keyword list does not already include the additional related keyword, wherein the updating the keyword list comprises:

updating the second input box to include the related keyword; and adding the additional related keyword to the second input box before the user completes selections of any remaining additional related keywords;

present to the user the updated keyword list via the interface unit; and enable a search by the user using the updated keyword list.

8. The system of claim 7, wherein the presenting the updated keyword list comprises presenting the updated keyword list using Cascading Style Sheets (CSS).

9. The system of claim 7, wherein the embedded window object includes a predetermined height value of the keyword list and an offset that is relative to an input box that presents the keyword list.

10. The system of claim 7, wherein the presenting the updated keyword list comprises presenting the updated keyword list using a predetermined graphic style.

* * * * *